United States Patent [19]
Buora

[11] Patent Number: 5,426,889
[45] Date of Patent: Jun. 27, 1995

[54] AUTOMATIC WATERING DEVICE FOR CULTIVATION IN POTS OR THE LIKE

[76] Inventor: Bruno Buora, Via G. Leopardi 5, 33085 Maniago (Pordenone), Italy

[21] Appl. No.: 187,711

[22] Filed: Jan. 28, 1994

[30] Foreign Application Priority Data

Feb. 10, 1993 [IT] Italy .................. UD93A0021

[51] Int. Cl.⁶ .................................... A01G 27/00
[52] U.S. Cl. .................................... 47/79
[58] Field of Search .................. 47/79, 80, 81, 48.5

[56] References Cited

U.S. PATENT DOCUMENTS

| | | | |
|---|---|---|---|
| 3,220,144 | 11/1965 | Green . | |
| 3,576,088 | 4/1971 | Arca | 47/81 |
| 3,800,471 | 4/1974 | Adams | 47/79 |
| 3,958,366 | 5/1976 | Meyers | 47/81 |
| 4,133,141 | 1/1979 | Lee | 47/79 |

FOREIGN PATENT DOCUMENTS

| | | | |
|---|---|---|---|
| 515207 | 11/1992 | European Pat. Off. | A01G 27/00 |
| 2255843 | 7/1975 | France | 47/81 |
| 2618297 | 7/1987 | France | A01G 27/00 |
| 128494 | 4/1901 | Germany | A01G 27/04 |
| 2118012 | 10/1983 | United Kingdom | A01G 27/00 |
| 2218609 | 11/1989 | United Kingdom | A01G 9/02 |

*Primary Examiner*—Henry E. Raduazo
*Attorney, Agent, or Firm*—Antonelli, Terry, Stout & Kraus

[57] ABSTRACT

Automatic watering device for cultivation in pots or the like, which can be applied to flower-pots, flower-boxes or anything else (12) suitable for the cultivation of flowers and/or plants, the pots, boxes, etc. (12) being able to be newly constructed or already existing, the device being suitable to supply liquid automatically to wet cultivation substratum (28) positioned on the device, a main pot (12) cooperating with an underlying lower pot (13) through at least one conduit (22) having openings at its ends, the lower end of the conduit (22) being associated with retaining mesh means (23), the pot (12) containing at least one box-shaped container (11) having the function of an inner tank (26) and having openings (19) in the vicinity of its lower periphery, the box-shaped container (11) including bleeder means (24).

10 Claims, 2 Drawing Sheets

AUTOMATIC WATERING DEVICE FOR CULTIVATION IN POTS OR THE LIKE

BACKGROUND OF THE INVENTION

This invention concerns an automatic watering device for cultivation in pots or the like.

To be more exact the invention concerns a device suitable to feed and wet cultivation substrata correctly in summer and winter and able to ensure a great operating endurance and to be fitted to any container, whether already existing or not, for cultivation purposes.

The automatic watering device according to the invention is especially advantageous in the case of cultivation employing the "high and low tide" system, also called the "ebb and flow" system, whereby the crop is alternately flooded and dried.

In these particular cultivation systems the re-supply of water has to take place only after the existing quantity of water has been wholly exhausted, thus causing in the plant a hydric stress which strengthens the plant and ensures for it a lush and healthy growth.

The state of the art covers manifold devices or systems for cultivation in pots or the like, such devices or systems forming also patent applications in the name of the present applicant.

All the embodiments of the state of the art have the aim of ensuring a long working endurance from the standpoint of the maintaining of the cultivation.

In other words the tendency is to have a means of a great capacity, such as a tank to hold the wetting liquid, and suitable automatic aspiration means to deliver the liquid continuously and evenly to the cultivation substratum generally arranged above the tank.

The embodiments of the state of the art overcome the above problem thoroughly, even as regards the ease of applying the device to existing flower-pots, flower-boxes, containers, etc. but still entail the problem of a correct warning of the forthcoming exhaustion of the reserve of liquid.

The market calls for an embodiment which is as simple as possible from a constructional standpoint and is therefore cheap and which at the same time is fully functional from the point of view of its application to new or existing usage systems.

Moreover, the devices of the state of the art do not overcome the problem of controlling the level of the liquid inside the tank. This problem is felt in particular where cultivation is carried on with the "ebb and flow" system, since the water in the substratum has to be wholly used up before it can be replenished.

In fact, with this type of cultivation it is necessary to reach almost total dehydration of the cultivation substratum to prevent the occurrence of problems such as asphyxia or decomposition of the roots, with the resulting death of the plant.

This control of level is very difficult to achieve owing to the fact that the tank is not accessible from the outside inasmuch as it is positioned below the cultivation substratum.

Various systems to display the level have been disclosed which employ, for instance, a float, a warning light, an acoustic alarm, etc., but these systems do not meet the user's requirements.

In fact, the signalling apparatus often remains hidden by the vegetation, or jams, or goes dead or defective and thus prevents proper notification of the remaining stock of liquid.

Furthermore, with the devices of the state of the art it may happen that too much water is added, with a resulting escape of liquid from the overflow since the level of the liquid in the tank cannot be seen.

Moreover, with the devices of the state of the art there is no possibility of regulating the percentage of humidity in the cultivation substratum according to the requirements of water of the plant, for these requirements may vary according to the kind of plant and the climatic conditions.

In particular, everyone knows that plants- need much greater quantities of water in summer than in winter.

With the devices of the state of the art it may happen that in winter, so as to ensure that the cultivation substratum has a modest degree of humidity in order to avoid decomposition, it is necessary to have a smaller quantity of liquid in the main pot.

This situation entails the same problems linked to the knowledge of the level of the water in the tank.

Furthermore, the devices of the state of the art have a great height in proportion to the actual quantity of cultivation substratum which they hold, since the lower part of the main pot is taken up by the tank of liquid, and this fact leads to the use of pots or boxes which are aesthetically unsightly, or else the stock of water is very small and therefore lessens the endurance of the system considerably.

SUMMARY OF THE INVENTION

The present applicant has designed, tested and embodied this invention to overcome the shortcomings of the state of the art and to achieve further advantages.

The purpose of this invention is to provide an automatic watering device for cultivation in pots which ensures great endurance of the system and at the same time gives a correct and sure indication when the storage tank is empty.

The indication that the tank is empty is of fundamental importance for an "ebb and flow" cultivation system, for the replenishing of the water should take place only when the water contained has been completely exhausted and the cultivation substratum is almost wholly dehydrated.

The automatic watering device for cultivation in pots or the like according to the invention consists of a main pot or box with a reserve of water in which it is desired to perform the cultivation in association with an underlying lower pot.

Automatic aspiration means are installed on the bottom of the main pot in a substantially vertical position and put the inside of the main pot in communication with the underlying lower pot; a box-shaped container consisting advantageously of a porous material is included within the main pot.

According to a first lay-out the box-shaped container has all its sides closed.

According to another lay-out of the invention the container has its bottom at least partly open.

According to yet another lay-out the container consists of a lower part of the main pot; a substantially horizontal partition is included and acts as the roof of the container.

The main pot in the device according to the invention can also be made of a porous material such as terracotta, for any outward filtration of water will be compensated by the aspiration of the automatic aspiration means drawing liquid from the underlying lower pot.

The box-shaped container is placed substantially in contact with the bottom of the main pot and forms the inner tank for the wetting liquid.

The box-shaped container includes at the lower edge of its sidewalls openings which enable the wetting liquid to pass inwards or outwards.

Owing to the principle of intercommunicating pots, the same level of liquid is established inside and outside the container.

Replenishment of the desired level of water can be obtained by watering from above the substratum contained in the main pot.

According to a variant the upper roof of the container, which in practice acts as a support for the cultivation substratum, may include a hole associated with an outer pipe having the purpose of replenishing the wetting liquid directly into the container.

Bleeder means through which the air in the container emerges to allow liquid to enter the container are included in a sidewall of the container at a suitable height. These bleeder means consist of a hole suitably closed by a mesh which prevents the cultivation substratum entering the container.

According to a variant a bleeder pipe is associated with the bleeder hole and connects the inside of the container to one of the automatic aspiration means.

During the step of re-filling the inner tank through the replenishment means, the bleeder pipe enables the air in the container to emerge and permits the wetting liquid to fill the inner tank up to the level established on its sidewalls.

The bleeder pipe can also act as an overflow for any excess wetting liquid fed through the replenishment means, so that excess liquid passes thus from the inner tank into the lower pot through the automatic aspiration means.

When the level of the water in the container and therefore in the main pot exceeds the height of the automatic aspiration means, the automatic aspiration means act as a spillway and the excess water is discharged into the underlying pot.

In a second lay-out of the invent ion the box-shaped container consists of the lower part of the main pot, which is separated from the upper part of the main pot by a partition acting as a roof.

The cultivation substratum, which is spread so-as to cover this roof completely, is wetted by the liquid in the lower pot and by the liquid in the inner tank defined by the box-shaped container.

Conduits filled with cultivation substratum are made in the roof of the container and act as automatic aspiration means.

Some of these automatic aspiration means are associated at their lower end with the lower pot, while the other automatic aspiration means are associated with the inner tank.

The automatic aspiration means are closed advantageously at their lower end by mesh means, which prevent the substratum going into the lower pot or inner tank.

The automatic aspiration means associated with the lower pot have at a suitable height bleeder means, which are advantageously closed by mesh means and put the inner tank in communication with the underlying lower pot and with the substratum held in the main pot. These bleeder means also determine the maximum level which can be reached by the liquid in the tank and act as spillings to discharge the water into the lower pot when the quantity of liquid immitted, from above for instance, is too great.

In the device according to the invention, therefore the cultivation substratum is kept at a required level of humidity by the water in the main pot and inner tank and by the water in the lower pot through the automatic aspiration means.

These automatic aspiration means enable the cultivation substratum to be wetted also by the water held in the lower pot.

Depending on the number and/or dimensions of the automatic aspiration means, the adjustment of the humidity of the cultivation substratum will take place through the openings in the inner tank and through the automatic aspiration means, which draw water from the lower pot.

For instance, during the hot weather, when the requirement of water is greater, the cultivation substratum will be wetted from above until the inner container has been wholly filled and the lower pot has been filled at least partly.

In this case the liquid within the main pot will be finished first and thereafter the liquid in the lower pot will be drawn upon.

The exhaustion of the water in the lower pot will give a correct signal for replenishing the water in the main pot.

In summer, therefore, the replenishing of water will be carried out mainly by adding water from above to the main pot until the water emerges into the lower pot.

The endurance of the device according to the invention will be increased advantageously by filling the lower pot to the brim from outside with a suitable quantity of water.

In the cold weather, as the requirement of water is much less, it will be enough to feed water into the lower pot and to leave the inner tank empty. Excessive wetting of the cultivation substratum leading to decomposition and asphyxia of the roots of the plant is thus avoided.

With the device according to the invention a mere glance at the lower pot will be enough in any season to identify correctly the right time to supply the plant with further water, this time coinciding with the condition of hydric stress. In fact, the lack of any water in the lower pot means that all the water in the main pot and inner tank has been absorbed and that topping-up should take place within one or two days to accomplish the best results.

The number and cross-section of the automatic aspiration means may vary according to the kind of plant to be cultivated.

Moreover, with this further outer reserve of water it is possible to reduce the capacity of the inner tank and thereby to increase the volume filled with cultivation substratum to nourish the plant, together with a good aesthetic outcome, as the height of the main pot is lessened.

Furthermore, more box-shaped containers can be put in one and the same pot or flower-box and be conformed advantageously so as to be coupled together.

Depending on the kind of vegetation to be planted in the pot, the automatic aspiration means will be more or less in number, and the invention therefore makes possible a more versatile use of the pots according to the plants to be cultivated.

BRIEF DESCRIPTION OF THE DRAWINGS

The attached figures are given as a non-restrictive example and show some preferred embodiments of the invention as follows.

DETAILED DESCRIPTION OF THE PREFERRED EMBODIMENT

Figure 1:
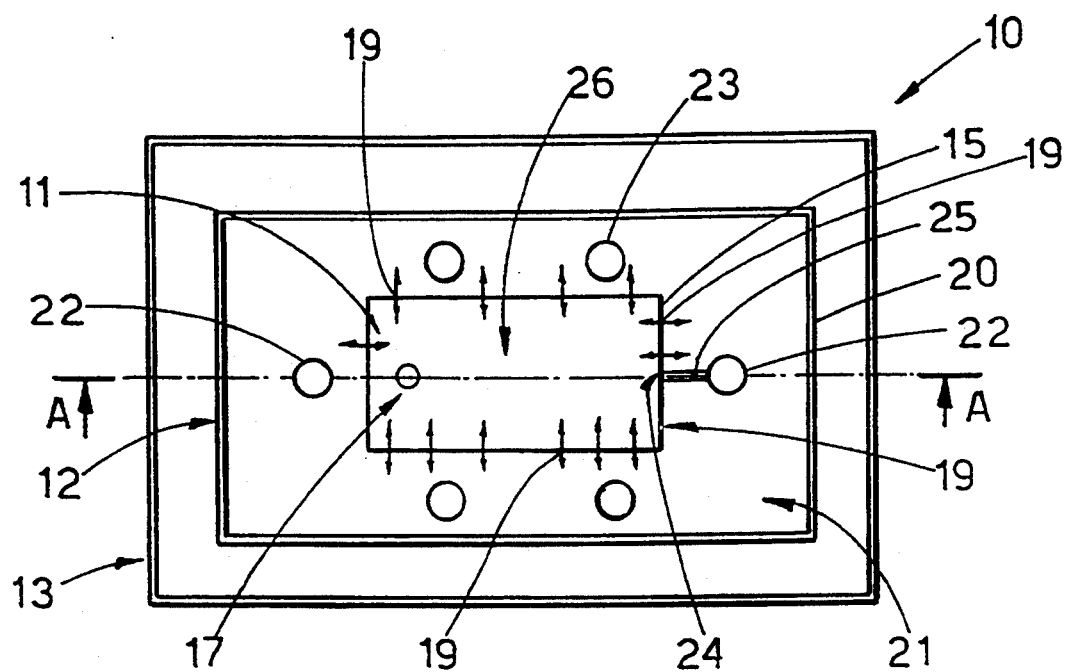
FIG. 1 is a plan view of a device for cultivation in pots according to the invention.
Figure 2:
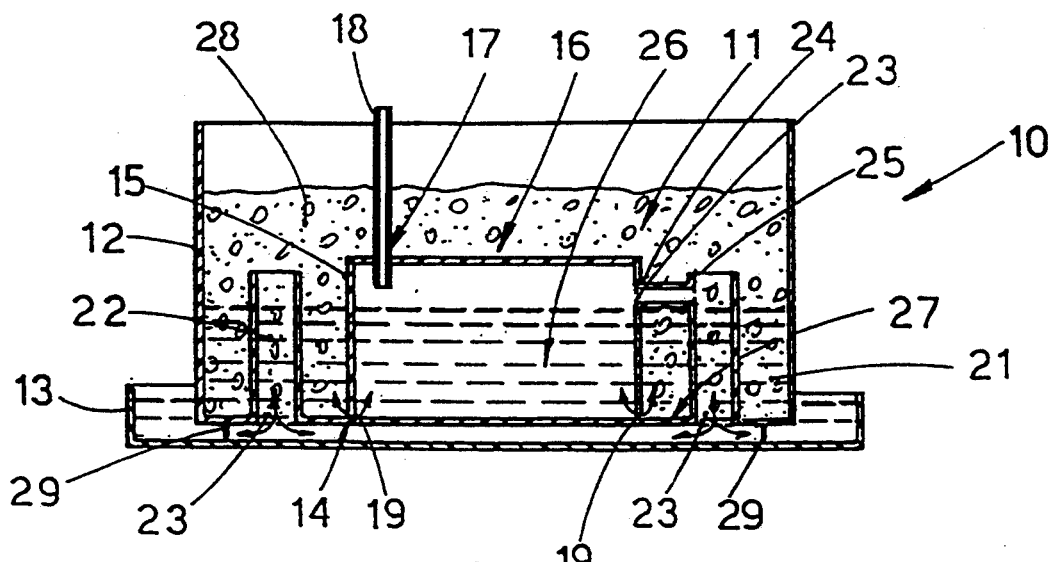
FIG. 2 shows a section of the device of FIG. 1 along the line A—A.

The reference number 10 in the attached figures denotes generally an automatic watering device for cultivation in pots 12 according to the invention.

The automatic watering device 10 for cultivation in pots 12 and the like according to the invention consists of a box-shaped container 11 which is placed on a bottom 27 of a main pot or box 12; this main pot 12 is associated with, and suitably distanced from, a lower pot 13 positioned therebelow.

According to a first embodiment of the invention the box-shaped container 11 has its bottom at least partly open.

According to a second embodiment of the invention the box-shaped container 11 has all its sides closed.

In this example spacer means 29 consist of supporting feet of the main pot 12.

The container 11 and main pot 12 in this case have a rectangular section, and the container 11 is located with its lower edge 14 substantially in contact with the inner bottom 27 of the main pot 12.

The container 11 defines an inner space 26, which acts as an inner tank for the wetting liquid, and an outer space 21 contained between the sidewalls 15 of the container 11 and the sidewalls 20 of the main pot 12.

Cultivation substratum 28 is dissolved and then spread on a roof 16 of the container 11 and in the space 21 surrounding the container 11.

Means to replenish the level of wetting liquid within the container 11 consist in this case of a first hole 17 bored in the roof 16 and connected to a first pipe 18, which extends so as to emerge above the top of the main pot 12.

If the means 17–18 to replenish the level of water are lacking, the cultivation substratum 28 can be watered directly from above.

A plurality of openings 19 of a required number and desired dimensions is bored in the lower edge 14 of the container 11 and enables the wetting liquid to spread evenly in the container 11 and in the outer space 21 between the sidewalls 15 of the container 11 and the sidewalls 20 of the main pot 12.

The cultivation substratum 28 held in the outer space 21 constitutes spontaneously the automatic aspiration means which draw the liquid lying on the bottom of the main pot 12 towards the material 28 arranged on the roof 16 and into the overlying layers of that material 28.

Substantially vertical and upwardly open conduits 22 filled with cultivation substratum 28 are located in the outer space 21 and are advantageously, but not necessarily, arranged symmetrically.

These conduits 22 are installed on the bottom 27 of the main pot 12 and are closed at their lower end with mesh means 23, which on the one hand prevent the substratum 28 falling into the lower pot 13 and on the other hand allow the liquid in the lower pot 13 to be aspirated by the substratum 28.

According to a variant the conduits 22 emerge through the bottom 27 of the main pot 12 so as to enable all the liquid held in the lower pot 13 to be dried up.

The conduits 22 thus constitute further automatic aspiration columns which draw the liquid held in the lower pot 13 towards the substratum 28 held in the main pot 12.

The position, number, shape and dimensions of these conduits 22 may vary as desired to suit the characteristics and requirements of the kind of plants to be cultivated or according to the climatic conditions.

If the surface taken up by the conduits 22 and the surface of the outer space 21 are suitably dimensioned, it is possible to give preference to the source which is to water the cultivation substratum 28.

To be more exact, it is possible to ensure that the cultivation substratum 28 is wetted preferably by liquid held in the inner container 11 or by liquid held in the lower pot 13.

The inner container 11 comprises in the upper part of at least one of its sidewalls 15 at least one second bleeder hole 24, which enables the air within the container 11 to be discharged while the container 11 is being filled. This second bleeder hole 24 is closed advantageously by mesh means 23, which prevent the cultivation substratum 28 entering the inner container 11.

In this example a second pipe 25 is associated with the second bleeder hole 24 and puts the inside of the container 11 in communication with one of the vertical conduits 22.

The second bleeder hole 24 acts also as an overflow when a great quantity of wetting liquid in the summer is filled through the replenishment means 17–18 or is poured directly onto the cultivation substratum 28 from above.

In fact, to achieve a greater soaking of the cultivation substratum 28 in summer, the liquid is poured directly onto the substratum 28 from above until it emerges through the automatic aspiration conduits 22 and fills the lower pot 13, thus showing that the box-shaped container 11 and the main pot 12 hold the maximum stock of water.

In the device 10 according to the invention the wetting of the cultivation substratum 28 is therefore ensured by two different sources, on the one hand by the liquid in the inner container 11 and on the bottom of the main pot 12 and on the other hand by the liquid in the lower pot 13.

Figure 3:
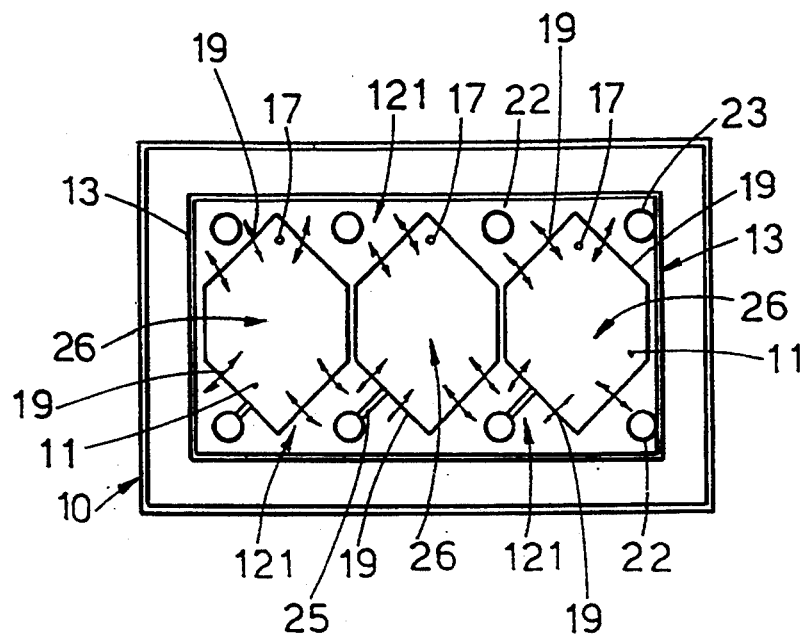
FIG. 3 shows a variant of the device of FIG. 1.

FIG. 3 shows another form of embodiment of the device 10 according to the invention, in which three containers 11 having a hexagonal cross-section are installed side by side.

In this example the containers 11 define eight spaces 121, which contain eight conduits 22 to feed water from the lower pot 13.

Figure 4:
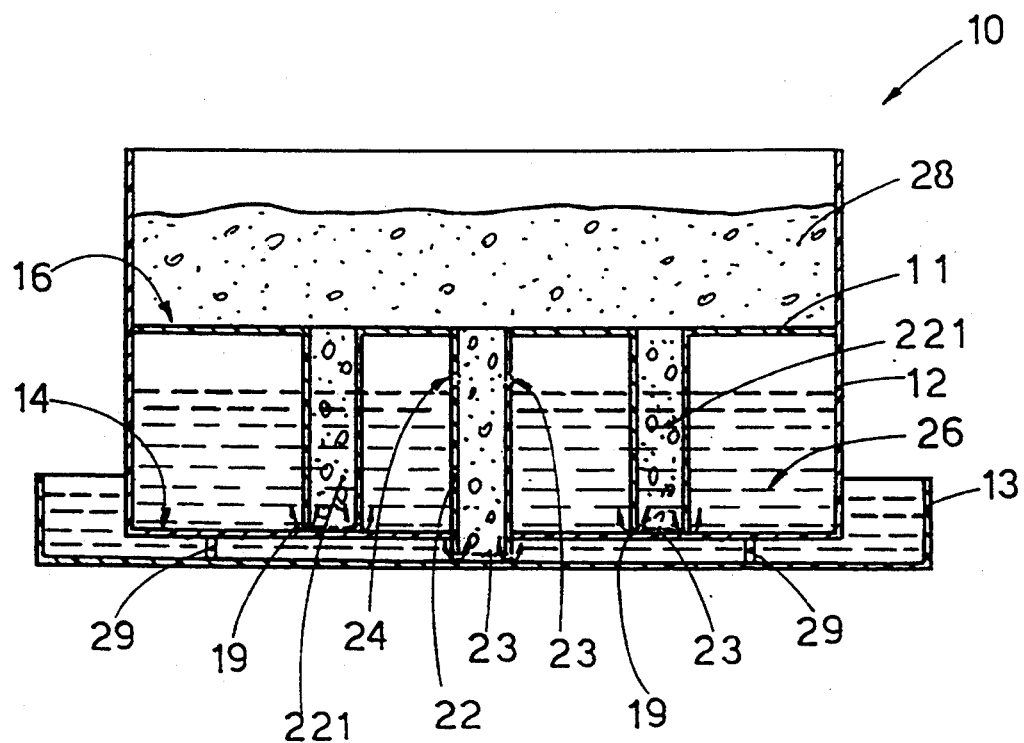
FIG. 4 shows a lengthwise section of a second form of embodiment of the device according to the invention.

FIG. 4 is a diagram of another form of embodiment of the invention, in which the box-shaped container 11 consists of the lower part of the main pot 12 defined by a substantially horizontal floor 16. This floor 16 acts also as a roof for the box-shaped container 11 and as a support for the cultivation substratum 28.

The cultivation substratum 28, which is spread to cover the whole of the roof 16, is wetted by the liquid in the lower pot 13 and by the liquid in an inner tank 26 defined by the box-shaped container 11.

Conduits 22-221 filled with cultivation substratum 28 and acting as automatic aspiration means are provided in the roof 16 of the box-shaped container 11; some 22 of these conduits are associated at their lower end with the lower pot, whereas other conduits 221 are associated with the inner tank 26.

These automatic aspiration conduits 22-221 are closed advantageously at their lower end by mesh means 23, which prevent the cultivation substratum 28 descending into the lower pot 13 or going into the inner tank 26.

The automatic aspiration conduits 22 associated with the lower pot 13 include at a suitable height the second bleeder holes 24, which are closed advantageously by mesh means 23 and put the inner tank 26 into communication with the underlying lower pot 13 and with the cultivation substratum 28 held in the main pot 12. These bleeder holes 24 define also the maximum level which can be reached by the liquid in the inner tank 26 by acting as spillways and discharging the liquid into the lower pot 13 when the quantity of liquid immitted from above is too great.

What is claimed is:

1. Automatic watering device for cultivation in pots, comprising:
    a main pot;
    an underlying pot provided under and spaced from said main pot;
    at least one conduit open at each end for communication between said main pot and said underlying pot, said at least one conduit being provided with a retaining mesh at its lower end;
    an inner tank for holding wetting liquid provided within said main pot, said inner tank having openings in a vicinity of its lower periphery for communication between said inner tank and said main pot;
    a bleeder hole provided in said inner tank to enable air within said inner tank to escape while said inner tank is being filled; and
    a cultivation substratum provided in said main pot on said inner tank.

2. Device as in claim 1, wherein said inner tank is box-shaped.

3. Device as in claim 1, in which the bleeder hole is associated with a retaining mesh.

4. Device as in claim 1, in which the bleeder hole is associated with a bleeder pipe connected to as lease one conduit.

5. Device as in claim 1, in which the inner tank includes a replenishment conduit cooperating with the upper part of the cultivation substratum held in the main pot.

6. Device as in claim 1, in which the at least one conduit is secured to the bottom of the main pot and defines with its interior a through passage to the underlying pot.

7. Device as in claim 1, in which a spacer is included between the main pot and the underlying pot.

8. Device as in claim 1, in which the inner tank has its bottom at least partly open.

9. Device as in claim 1, in which the inner tank has all its sides closed.

10. Device as in claim 1, in which the inner tank is embodied directly with the lower part of the main pot together with the addition of a partition acting as a roof.

* * * * *